US008854697B2

(12) United States Patent
Pesar

(10) Patent No.: US 8,854,697 B2
(45) Date of Patent: Oct. 7, 2014

(54) SYSTEM AND METHOD FOR SCANNING AND ENLARGING USER SELECTED GRID AREAS OF A PRINTED PAGE

(75) Inventor: Robert J. Pesar, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1147 days.

(21) Appl. No.: 12/497,355

(22) Filed: Jul. 2, 2009

(65) Prior Publication Data

US 2011/0001989 A1      Jan. 6, 2011

(51) Int. Cl.
  *H04N 1/393*  (2006.01)
  *G06K 15/00*  (2006.01)
  *G06F 15/00*  (2006.01)
  *H04N 1/387*  (2006.01)
  *H04N 1/00*   (2006.01)

(52) U.S. Cl.
  CPC ......... *H04N 1/00413* (2013.01); *H04N 1/3875* (2013.01); *H04N 1/00461* (2013.01); *H04N 1/0048* (2013.01); *H04N 1/00424* (2013.01); *H04N 1/00482* (2013.01); *H04N 2201/0091* (2013.01); *H04N 1/00453* (2013.01); *H04N 1/00411* (2013.01); *H04N 1/00474* (2013.01)
  USPC ............ 358/451; 358/1.2; 358/1.18; 358/449

(58) Field of Classification Search
  CPC ................................................. H04N 1/00002
  See application file for complete search history.

(56) References Cited

U.S. PATENT DOCUMENTS

| 6,549,299 | B1* | 4/2003 | Allen et al. ................... 358/1.18 |
|---|---|---|---|
| 2002/0036665 | A1* | 3/2002 | Shima ............................... 347/5 |
| 2002/0054379 | A1* | 5/2002 | Yamaguchi .................... 358/498 |
| 2003/0189612 | A1* | 10/2003 | Darby et al. ..................... 347/19 |
| 2003/0202211 | A1* | 10/2003 | Yudasaka et al. ............. 358/1.18 |
| 2004/0046999 | A1* | 3/2004 | Watanabe et al. ............ 358/1.16 |
| 2004/0234169 | A1* | 11/2004 | Tojo ............................... 382/305 |
| 2005/0180778 | A1* | 8/2005 | Hooley ......................... 399/197 |
| 2008/0141885 | A1* | 6/2008 | Hu ................................. 101/483 |
| 2008/0231872 | A1* | 9/2008 | Sugahara et al. .............. 358/1.6 |
| 2008/0271617 | A1* | 11/2008 | Ebisawa et al. ............... 101/114 |
| 2008/0285065 | A1* | 11/2008 | Baba ............................ 358/1.13 |
| 2009/0070348 | A1* | 3/2009 | Uejo ............................. 707/100 |
| 2009/0086241 | A1* | 4/2009 | Ito ................................ 358/1.13 |
| 2009/0190977 | A1* | 7/2009 | Shimizu ........................ 399/366 |
| 2011/0001997 | A1* | 1/2011 | Pesar ........................... 358/1.13 |

* cited by examiner

*Primary Examiner* — Vincent Rudolph
(74) *Attorney, Agent, or Firm* — MH2 Technology Law Group LLP

(57) ABSTRACT

Systems and methods of scanning, enlarging, and printing one or more selected areas of a document are disclosed. The systems and methods include an imaging device that partitions a document into a plurality of grid areas and receives, from a user, a selection for one or more of the grid areas to be enlarged and printed. The imaging device further receives or determines an enlarged output size for the selected grid areas. The imaging device scans the document to form digital images corresponding to the selected grid areas, and adjusts and enlarges the digital images to equate to the enlarged output size. A printer of the imaging device outputs the enlarged digital images on paper of the output size.

19 Claims, 5 Drawing Sheets

SYSTEM AND METHOD FOR SCANNING AND ENLARGING USER SELECTED GRID AREAS OF A PRINTED PAGE

FIELD OF THE INVENTION

The present embodiments relate to the field of printing and imaging devices, and more particularly to systems and methods for selectively scanning, enlarging, and printing a document.

BACKGROUND OF THE INVENTION

The use of digital input scanners on imaging devices, which can successively scan a set of sheets and record the images thereon as digital data, is well established, such as in imaging devices and electronic archiving. A user of such imaging devices can copy a document or a series of documents by loading the documents into the imaging device, which scans the documents to create the digital images of the documents, and a printer of the imaging device can print the digital images onto a print medium to create copied versions of the original documents. The imaging device also has a memory to store digital images for increased cycle speed and ease of replication.

However, existing imaging devices are limited as to how the documents are scanned, copied, and printed. One such limitation is that a user does not have an option to enlarge one or more specific portions of a document. Instead, enlargements are often based on an initial positioning of the received document. For example, a user using a flatbed scanner has to manually position the document at a specific location to enlarge a desired section of the document. Further, enlargement options on existing systems are limited. For example, there is no way for a user to specify the size or boundaries of a desired area to be enlarged.

A need, therefore, exists for systems and methods to allow a user to select specific areas of a document to enlarge. Further, a need exists for systems and methods to allow a user to select a size for a selected area of a document as well as a corresponding output size.

SUMMARY OF THE EMBODIMENTS

The following presents a simplified summary in order to provide a basic understanding of some aspects of one or more embodiments. This summary is not an extensive overview, nor is it intended to identify key or critical elements of the embodiments nor to delineate the scope of the embodiments. Rather, its primary purpose is merely to present one or more concepts in simplified form as a prelude to the detailed description presented later.

In accordance with the present teachings, a method of printing a selected area of a document is provided. The method comprises partitioning the document into a plurality of grid areas, receiving a selection for one or more of the grid areas to be printed at an enlarged output size, forming one or more digital images corresponding to the one or more selected grid areas, modifying the one or more digital images to correspond to the enlarged output size, and printing the one or more modified digital images at the enlarged output size In accordance with the present teachings, an inkjet printing system is provided.

In accordance with the present teachings, an imaging device for printing a selected area of a document is provided. The imaging device comprises a processor configured to partition the document into a plurality of grid areas, and a user interface configured to receive a selection for one or more of the grid areas to be printed at an enlarged output size. A scanner is configured to form one or more digital images corresponding to the one or more selected grid areas, wherein the processor is further configured to modify the one or more digital images to correspond to the enlarged output size. Further, the imaging device comprises a printer configured to output the one or more modified digital images at the enlarged output size.

BRIEF DESCRIPTION OF THE DRAWINGS

The accompanying drawings, which are incorporated in and constitute a part of this specification, illustrate embodiments and together with the description, serve to explain the principles of the embodiments. In the figures.

It should be noted that some details of the drawings have been simplified and are drawn to facilitate understanding of the inventive embodiments rather than to maintain strict structural accuracy, detail, and scale.

DESCRIPTION OF THE EMBODIMENTS

Reference will now be made in detail to the present and exemplary embodiments, examples of which are illustrated in the accompanying drawings. Wherever possible, the same reference numbers will be used throughout the drawings to refer to the same or like parts.

Various embodiments provide systems and methods that allow a user to selectively scan, enlarge, and/or print selected portions or areas of a document from an imaging device. The imaging device can be a multifunction device, as known in the art, capable of such functions as copying, scanning, printing, faxing, and the like. In embodiments, a user can load the document into, for example, a scanning tray, of the imaging device. The imaging device can sense the loaded document and can automatically determine the size of the document from one or more settings of the imaging device. In embodiments, the imaging device can receive an indication of the size from the user. The user can input an amount or plurality of grid areas or elements in which to partition the document, along with a selection of one or more of the grid areas to enlarge and print. The user can further specify a size of the enlarged output documents.

Further, in embodiments, the imaging device can scan the document to create a digital image of the document. In embodiments, the document can be multiple pages, and the imaging device can scan corresponding pages of the document and save corresponding digital images to be accessed and enlarged at a later time. For example, a user can select saved images from a previous scan to be enlarged individually or enlarged concurrently with a currently-loaded page. The imaging device can further partition the digital image into the specified plurality of grid areas and can assign identifiers to each of the partitioned grid areas. In embodiments, the identifiers can be what the user refers to when selecting which grid areas are to be enlarged. The imaging device can enlarge the selected partitioned grid areas using methods known in the art such as, for example, applying image enhancement techniques. A printer of the imaging device can output the enlarged image at the output size specified by the user. In embodiments, the user can specify the desired number of copies of each of the selected grid areas.

Figure 1:
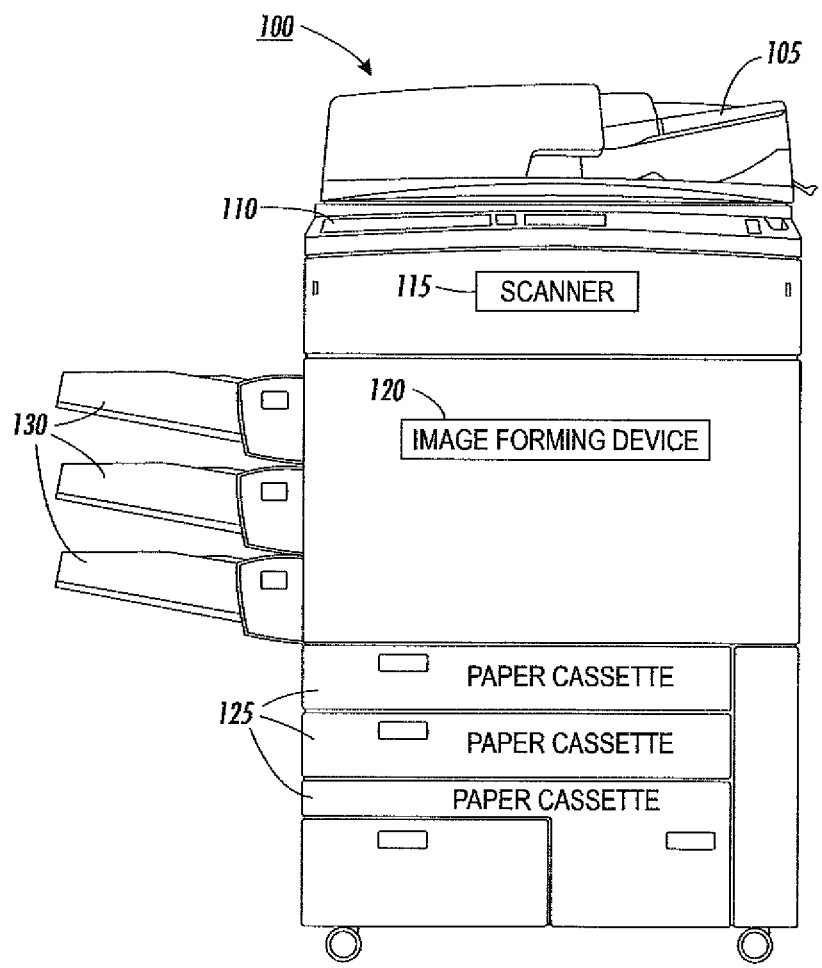
FIG. 1 depicts an exemplary imaging device according to the present teachings.

Referring to FIG. 1, depicted is an exemplary imaging device 100 according to embodiments. The imaging device 100 can generally refer to a multifunction or multipurpose device capable of copying, printing, faxing, and/or scanning one or more documents. Generally, these devices can also include a network connection, either a local area connection (LAN) such as an Ethernet interface, or a modem that can connect to a phone line (not shown in figures).

The imaging device 100 can comprise a document feeder 105, a user interface (UI) 110, a scanner 115, and an image forming device 120. The document feeder 105 can be configured to receive one or more documents from a user. An automatic document feeder (not shown in figures) can transport the one or more documents from the document feeder 105 to other components of the imaging device 100 such as, for example, the scanner 115. The UI 110 can receive input or selections from the user relating to the functionality of the imaging device 100. For example, a user can choose to scan a document from the document feeder 105 and specify options according to the present embodiments via the UI 110.

The scanner 115 can scan a document received from the document feeder 105 and can create a digital image of the scanned document. In the present embodiments, the scanner 115 can create a plurality of digital images corresponding to partitioned areas of the document consistent with user selected grid areas. The imaging device 100 can enlarge the plurality of digital images as known in the art. The enlarged digital images can be printed at the image forming device 120 on documents pulled from one or more paper cassettes 125. The printed enlarged documents can be output from the imaging device to one or more output trays 130. In embodiments, the quality of the enlarged images can depend upon various factors such as, for example, the quality of the original document, the resolution of the scanner 115, the use of image enhancement software, the resolution of the image forming device 120, and other factors.

Figure 2:
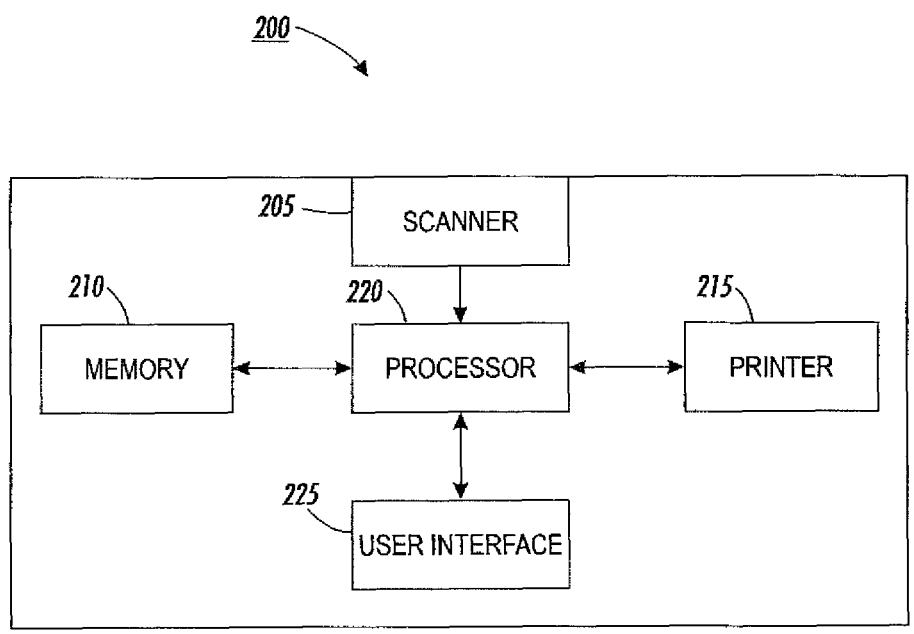
FIG. 2 depicts an exemplary hardware diagram of an imaging device according to present teachings.

FIG. 2 depicts an exemplary hardware diagram of an imaging device 200 according to embodiments. The imaging device 200 can comprise a scanner 205, a memory 210, and a printer 215. The scanner 205 in combination with a processor 220 can scan hard copy original documents, convert the original documents into digital images, process the digital images, and save the scanned, processed, and enlarged images in the memory 210. For example, the memory 210 can be any storage device capable of storing data such as a server, a local or remote hard drive, a portable jump drive, and the like. The printer 215 can produce a printed copy of the original documents, the processed images, enlarged portions of the documents, and other arrangements of the documents according to the present embodiments.

The processor 220 can process image data and direct the functions of the imaging device 200 as described herein. For example, the processor 220 can obtain or retrieve digital image data for the scanned document from the scanner 205, and process the digital image data according to present embodiments. The processor 220 can be coupled to a user interface (UI) 225 comprising, for example, a touchpad or series of buttons which can allow a user a control and a user-readable setup and status screen. In use, the user can select one or more functions and/or options from a number of different functions and/or options provided by the imaging device 200 through the use of the UI 225. For example, the user can select to enlarge and print a certain number of selected sections or areas of an original document via the UI 225. The processor 220 can further direct the printer 215 to output printed pages according to selections received at the UI 225.

Figure 3:
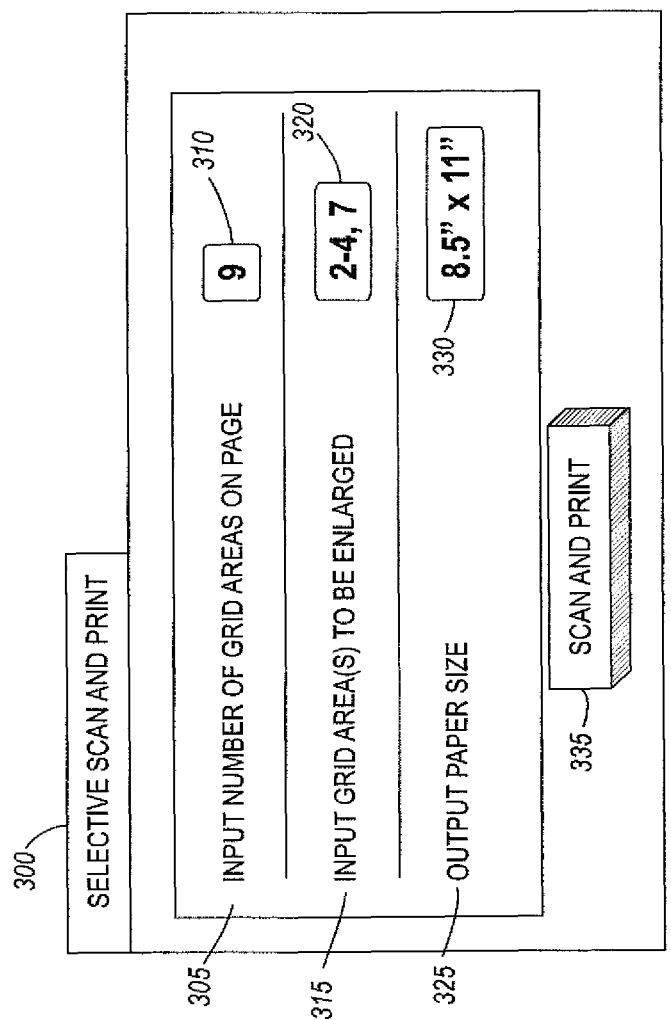
FIG. 3 depicts an exemplary user interface display of an imaging device according to the present teachings.

Referring to FIG. 3, depicted is an exemplary UI display 300. The UI display 300 can display the currently-selected function of the UI of the imaging device. For example, the function can be "Selective Scan and Print," as shown in FIG. 3, although it should be appreciated that the function title is merely exemplary. The UI display 300 can further display one or more options corresponding to the currently-selected function. It should be appreciated that the one or more options can be in any order, comprise any wording combination, and control any associated operation of the currently-selected function. For example, as depicted in FIG. 3, the UI display 300 can display the following options for the exemplary "Selective Scan and Print" function: "Input Number of Grid Areas on Page" (305), "Input Grid Area(s) to be Enlarged" (315), and "Output Paper Size" (325). Each of the displayed options can have associated user input boxes 310, 320, and 330 that can each receive user input corresponding to the associated display option. In embodiments, the user can input values into the input boxes 310, 320, and 330 via a pop-up keyboard of the UI or via other methods known in the art.

In use, the "Input Number of Grid Areas on Page" (305) option can query, from the user, a number of grids in which to partition or divide the original document. In embodiments, the user can input the size of the original document, or the imaging device can automatically sense the size of the document upon the document being loaded into the imaging device, via, for example, one or more settings of the imaging device. The user can input the number of grids in which to partition the document into input box 310. For example, if the user enters four (4) into the input box 310, the processor of the imaging device can divide the digital image into four (4) images.

In embodiments, the default option for partitioning can be to divide the image into equal-sized grids. For example, if the original document measures 8.5"×11", and the user enters four (4) into the input box 310, then the digital image can be partitioned into four (4) images, each having an equal size of 4.25"×5.5". However, it should be appreciated that the user can specify the size of the partitioned grids of the inputted document. For example, the user can specify whether the grids are to be equally-sized, and if not, specify the size of each of the grids.

In embodiments, the imaging device can scan the inputted document and the processor can process the corresponding digital image according to the present embodiments. For example, the processor can partition the digital image into the appropriate number and size grids as specified by the user, and create separate image data files corresponding to the partitioned grids. The separate image data files can be transmitted to and stored in memory.

The processor can further assign an indicator, such as, for example, a letter, a number, or another marking, that can serve to identify specific image grids. For example, if a document is partitioned into four (4) grid areas, then the processor can assign numbers 1, 2, 3, and 4 as indicators to each of the grid areas. The indicators can be stored as data along with the corresponding image data files.

The "Input Grid Area(s) to be Enlarged" (315) option can query, from the user, which specific processed image grids are to be enlarged and/or printed by the imaging device. The user can input the specific processed image grids into input box 320. The specific processed image grids can correspond to the indicators assigned to the processed digital grid images. For example, if the user enters "1-3" into input box 320, the imaging device can retrieve the grid images of the inputted document with associated indicators 1, 2, and 3. In embodiments, the imaging device can read different combinations and Boolean operators such as, for example, "1, 2, and 7," "1-3, and 9," "6-8, 12," etc., consistent with that known in the art.

In embodiments, the imaging device can warn the user when the inputted grid areas in input box 320 do not correspond to the inputted number of grid areas on page in input box 310. For example, if the user enters "4" in input box 310, and enters "4, 6" in input box 320, then the imaging device can warn the user that "6" is an invalid entry for the inputted document because the document only has 4 grid areas. In embodiments, the UI of the imaging device can allow the user to correct any errors. In further embodiments, the UI can provide a preview of the selected grid areas by, for example, displaying an exemplary grid of the document with representations of the selected grid areas highlighted. This can allow the user can confirm the desired areas of the document to be enlarged and printed.

The "Output Paper Size" (325) option can query, from the user, the desired printed paper size of the selected grid areas. More specifically, the imaging device can output each of the areas in the selected grid areas (input box 320) on paper having the output paper size. The user can input the output paper size into input box 330. In embodiments, each of the selected grid areas can be printed on the same paper size. However, it should be appreciated that the user can specify different output paper sizes for different selected grid areas. For example, the user can input 8.5"×11" as the output size for one selected grid area, and 11"×17" as the output size for another selected grid area.

In embodiments, the user can select to enlarge multiple grid areas per output page, such that the enlarged multiple grid areas can be multiplicative on the output page. For example, a user can select to enlarge and output two or more grid areas onto a single output page. In embodiments, the UI display 300 can prompt the user with an option to enter a number of enlarged grid areas per output page as well as a selection for which grid areas to output onto which output page.

The UI display 300 can further comprise a scan and print button 335 that can be selectable by the user. In embodiments, the user can select the scan and print button 335 after inputting the corresponding values into input boxes 310, 320, 330. Upon selection of the scan and print button 335, the imaging device can process the inputted document according to the inputted values. In embodiments, the UI display 300 can warn the user of inconsistent, incomplete, or missing inputs of input boxes 310, 320, 330. Further, in embodiments, the UI display 300 can prompt the user to enter incomplete or missing inputs, prompt the user to replace inconsistent inputs, or inform the user of other errors. For example, if the user enters 8.5"×11" in input box 330, and the imaging device is out of 8.5"×11" sized paper, then the UI display 300 can inform the user that the imaging device is out of the selected-sized paper. After the user selects the scan and print button 335 and there are not any errors with the inputted values, the imaging device can scan the document, and enlarge and print the selected grid areas according to the present embodiments.

In embodiments, after the imaging device scans the document, the UI display 300 can display a digital image of the scanned document with the selected grid areas optionally highlighted. The user can confirm the selected grid areas or can modify any or all of the inputs. In further embodiments, the user can select or deselect the grid areas to enlarge and print directly from the displayed digital image on the UI display 300 by, for example, touching the corresponding areas on the displayed digital image. Once the user selects or confirms the selection of the grid areas, the imaging device can enlarge and print the selected grid areas according to the present embodiments.

Figure 4:
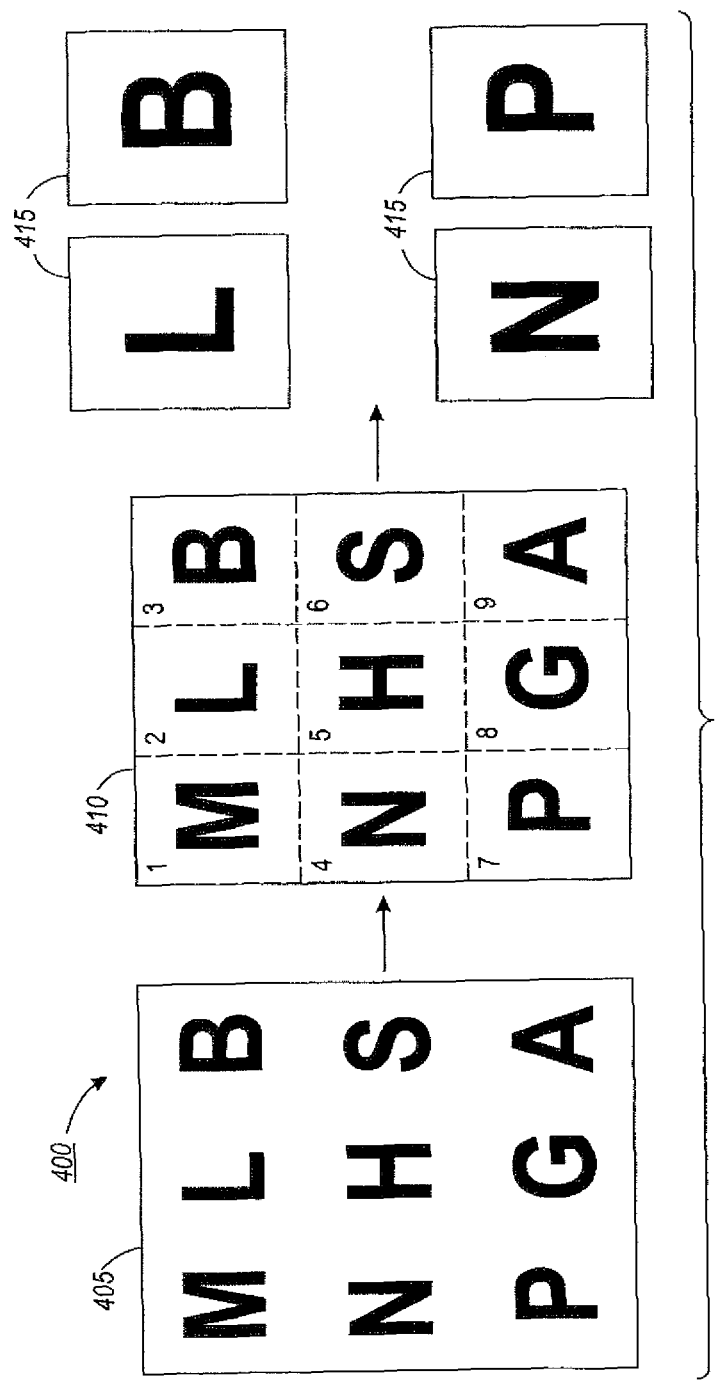
FIG. 4 depicts an exemplary selective scan and print in use according to the present teachings.

FIG. 4 depicts an exemplary illustration of a selective scan and print 400 in use according to present embodiments. The selective scan and print 400 depicted is merely an illustrated embodiment of the present embodiments, and it should be understood that a document of any size and with any images or content thereon can be used in the systems and methods described herein. The selective scan and print 400 comprises three steps, as indicated by reference numerals 405, 410, and 415. The first step 405 depicts an exemplary document which can be loaded into an imaging device for a selective scan and print. As depicted in 405, the document illustrates nine (9) letters spaced thereon. The second step 410 depicts the document partitioned into nine (9) equal-sized grid areas. In embodiments, the number of partitions can be the number of grid areas on page specified by the user in the input box 310, as described with respect to FIG. 3. As further depicted in 410, each of the nine (9) partitions has an associated indicator, 1-9, that can be stored along with the corresponding grid image area. For example, the indicator "2" corresponds to the grid area depicting the letter "L."

The third step 415 depicts enlarged documents outputted by a printer of the imaging device corresponding to the grid areas selected by the user. Four (4) enlarged outputted documents are depicted in 415, namely, those corresponding to the grid areas with indicators 2 ("L"), 3 ("B"), 4 ("N"), and 7 ("P"), as depicted in 410. In embodiments, the outputted documents can be the grid area(s) to be enlarged specified by the user in the input box 320, as described with respect to FIG. 3. Further, in embodiments, the size of the outputted documents can be the size specified by the user in the output paper size input box 330, as described with respect to FIG. 3. In embodiments, the imaging device can enlarge the selected grid areas according to systems and methods known in the art. The quality of the enlarged image can depend upon various factors such as, for example, the quality of the original document, the resolution of the scanner, the use of image enhancement software, the resolution of the printer, and other factors.

In embodiments, the imaging device can be configured to adjust or handle scale mismatches in the output size of the enlarged image to the size of the corresponding grid area. For example, if the corresponding grid area is a square and the selected output size of the imaging is a rectangle, then the imaging device can stretch or skew one or more dimensions, add or remove blank space to or from one or more dimensions, or perform other modifications to coordinate the scale. In embodiments, the imaging device can store, in memory, digital images of the original document, grid areas with corresponding identifiers, and enlarged digital images for selected grid areas.

Figure 5:
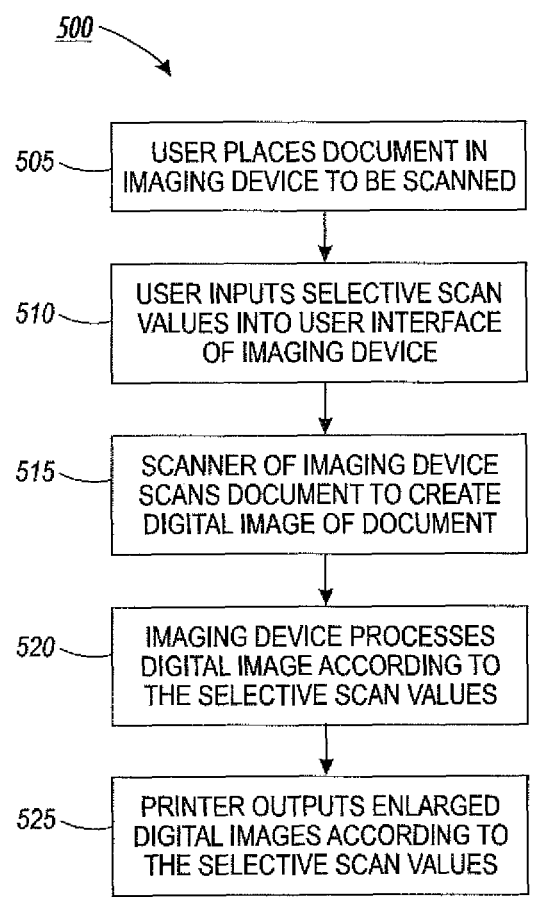
FIG. 5 depicts an exemplary flow diagram of selectively scanning and printing a document according to the present teachings.

Referring to FIG. 5, a present embodiment for an exemplary method 500 for selectively scanning and printing a document is depicted. It should be appreciated that the mechanical and electronic components of the imaging device can perform the steps of the method 500 such as, for example, the processor 220, the scanner 205, the memory 210, the printer 215, and other components, as depicted in FIG. 2.

In 505, a user can insert a document in the imaging device to be scanned. In embodiments, the document can be placed in a corresponding document feeder tray, drawer, or the like, that can be accessible by a scanner of the imaging device. In 510 the user can input selective scan values into a user interface of the imaging device. In embodiments, the selective scan values can be those described with respect to FIG. 3, namely, the number of grid areas on the page, the grid area(s) to be enlarged, and the output paper size. Further, in embodiments, the selective scan values can comprise additional inputs consistent with embodiments described herein.

In 515, the scanner of the imaging device can scan the document to create a digital image of the document. In embodiments, the scanner can automatically determine a number of grid areas in which to partition the document, in the absence of the user explicitly inputting the number of grid areas. For example, the scanner can have a default or selectable number of grid areas in which to partition the document, or can automatically detect markings on the document, such as outlines or other discrete markings that can indicate partitions. As such, a user would not need to enter a number of grid areas on the page, as described herein.

Further, in embodiments, the digital image of the document can be transferred to and stored in memory. Still further, in embodiments, the scanner can scan a document of multiple pages, and digital images of the multiple pages can be transferred to and stored in memory, and can further be selectable and accessed at a later time to be enlarged individually or enlarged concurrently with a loaded document. For example, a user can select to concurrently enlarge both a previously-scanned image stored in memory and an image on a page currently loaded in the imaging device.

In 520, the imaging device can process the digital image of the document according to the selective scan values input by the user. In embodiments, a processor of the imaging device can partition the digital image into the selected number of grid areas, assign identifiers to the grid areas, enlarge the selected grid areas to be enlarged, adjust mismatches in the scale of the grid areas to the output paper size, and perform other functions according to the present embodiments. In embodiments, the processor can send associated imaging data to memory to be stored such as, for example, digital images of the original document, grid area data with corresponding identifiers, and enlarged digital image data for the selected grid areas. In 525, a printer of the imaging device can output the enlarged digital images according to the inputted selective scan values. In embodiments, the printer can output one or more copies of each of the selected enlarged images.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

While the embodiments have been illustrated with respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A computer implemented method of printing a selected area of a document, comprising:
    detecting, using one or more electronic processors, a plurality of printable grid areas of the document, wherein the plurality of printable grid areas are of equal size and shape, wherein the plurality of printable grid areas are detected from markings already present on the document, and wherein the printable grid areas completely cover and partition the document;
    receiving, at an electronic user interface and using an electronic processor, an electronic selection for one or more of the plurality of printable grid areas to be printed at an enlarged output size;
    forming, using the one or more electronic processors, one or more digital images corresponding to the one or more selected grid areas;
    modifying, using the one or more electronic processors, the one or more digital images to correspond to the enlarged output size; and
    printing the one or more modified digital images at the enlarged output size.

2. The method of claim 1, wherein the step of receiving the electronic selection for the one or more of the plurality of printable grid areas comprises:
    assigning an identifier to each of the plurality of printable grid areas, wherein the one or more selected grid areas correspond to the identifiers.

3. The method of claim 1, further comprising:
    adjusting a scale between a size of the one or more digital images and the enlarged output size.

4. The method of claim 1, wherein the step of modifying the one or more digital images to correspond to the enlarged output size comprises enlarging a size of the one or more digital images to equate to the enlarged output size.

5. The method of claim 1, further comprising:
receiving an indication of a presence of the document; and
determining a size of the document.

6. The method of claim 1, further comprising:
warning a user of one or more errors in the electronic selection for the one or more selected grid areas.

7. The method of claim 1, further comprising:
providing a preview comprising a representation of the one or more selected grid areas.

8. The method of claim 1, wherein the document comprises multiple pages.

9. The method of claim 1, wherein the enlarged output size is multiplicative on a printed output page.

10. An imaging device for printing a selected area of a document, comprising:
- a processor configured to detect a plurality of printable grid areas of the document, wherein the plurality of printable grid areas are of equal size and shape, wherein the plurality of printable grid areas are detected from markings already present on the document, and wherein the printable grid areas completely cover and partition the document;
- a user interface configured to receive an electronic selection for one or more of the plurality of printable grid areas to be printed at an enlarged output size;
- a scanner configured to form one or more digital images corresponding to the one or more selected grid areas, wherein the processor is further configured to modify the one or more digital images to correspond to the enlarged output size; and
- a printer configured to output the one or more modified digital images at the enlarged output size.

11. The device of claim 10, wherein the processor is further configured to assign an identifier to each of the plurality of printable grid areas, wherein the one or more selected grid areas correspond to the identifiers.

12. The device of claim 10, wherein the processor is further configured to adjust a scale between a size of the one or more digital images and the enlarged output size.

13. The device of claim 10, wherein the modification of the one or more digital images to correspond to enlarged output size comprises enlarging a size of the one or more digital images to equate to the enlarged output size.

14. The device of claim 10, wherein the processor is further configured to:
receive an indication of a presence of the document at the scanner; and
determine a size of the document.

15. The device of claim 10, wherein the processor is further configured to warn a user of one or more errors in the electronic selection for the one or more selected grid areas.

16. The device of claim 10, wherein the user interface is further configured to provide a preview comprising a representation of the one or more selected grid areas.

17. The device of claim 16, wherein the preview further comprises the one or more digital images.

18. The device claim 10, wherein the document comprises multiple pages.

19. The device of claim 10, wherein the enlarged output size is multiplicative on a printed output page.

* * * * *